No. 778,739. PATENTED DEC. 27, 1904.
H. C. BUHOUP.
CAR TRUCK.
APPLICATION FILED AUG. 25, 1904.
3 SHEETS—SHEET 2.
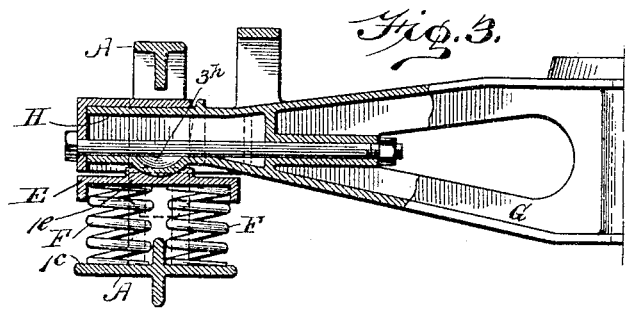
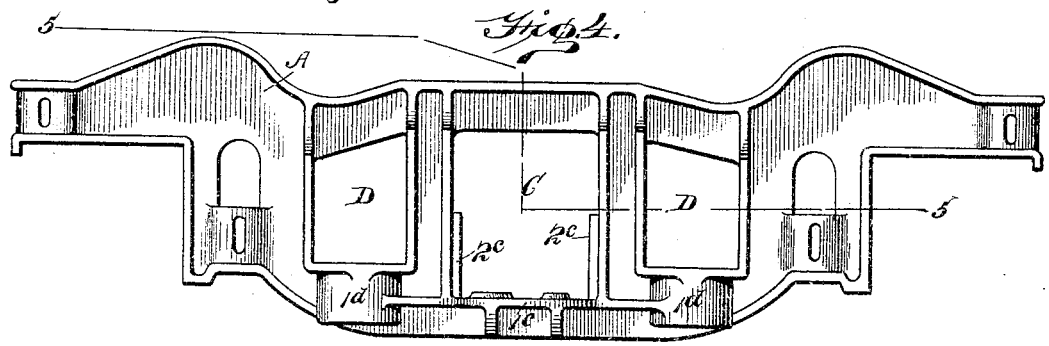
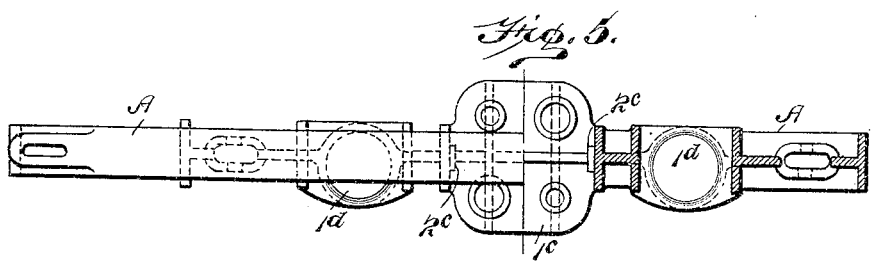
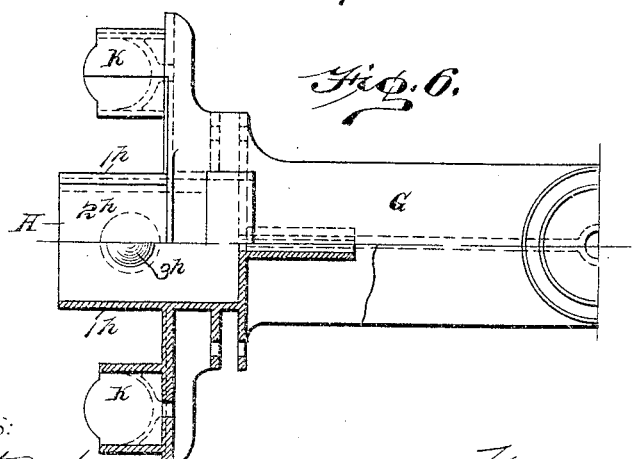
WITNESSES:
INVENTOR
Harry C. Buhoup
By F. N. Ritter Jr
Attorney No. 778,739. PATENTED DEC. 27, 1904.
H. C. BUHOUP.
CAR TRUCK.
APPLICATION FILED AUG. 25, 1904.
3 SHEETS—SHEET 3.
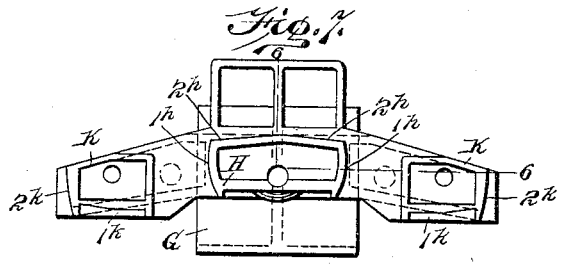
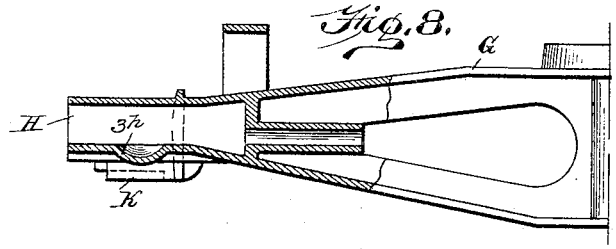
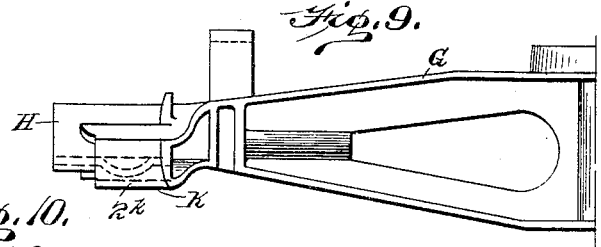
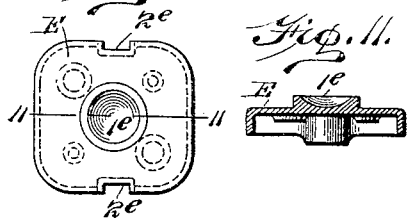
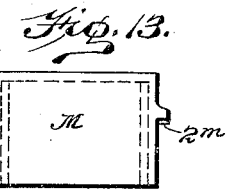
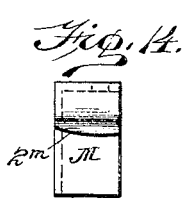
WITNESSES:
H. G. Dieterich
G. F. Ritter
INVENTOR
Harry C. Buhoup
BY F. M. Ritter Jr.
Attorney No. 778,739.  
Patented December 27, 1904.

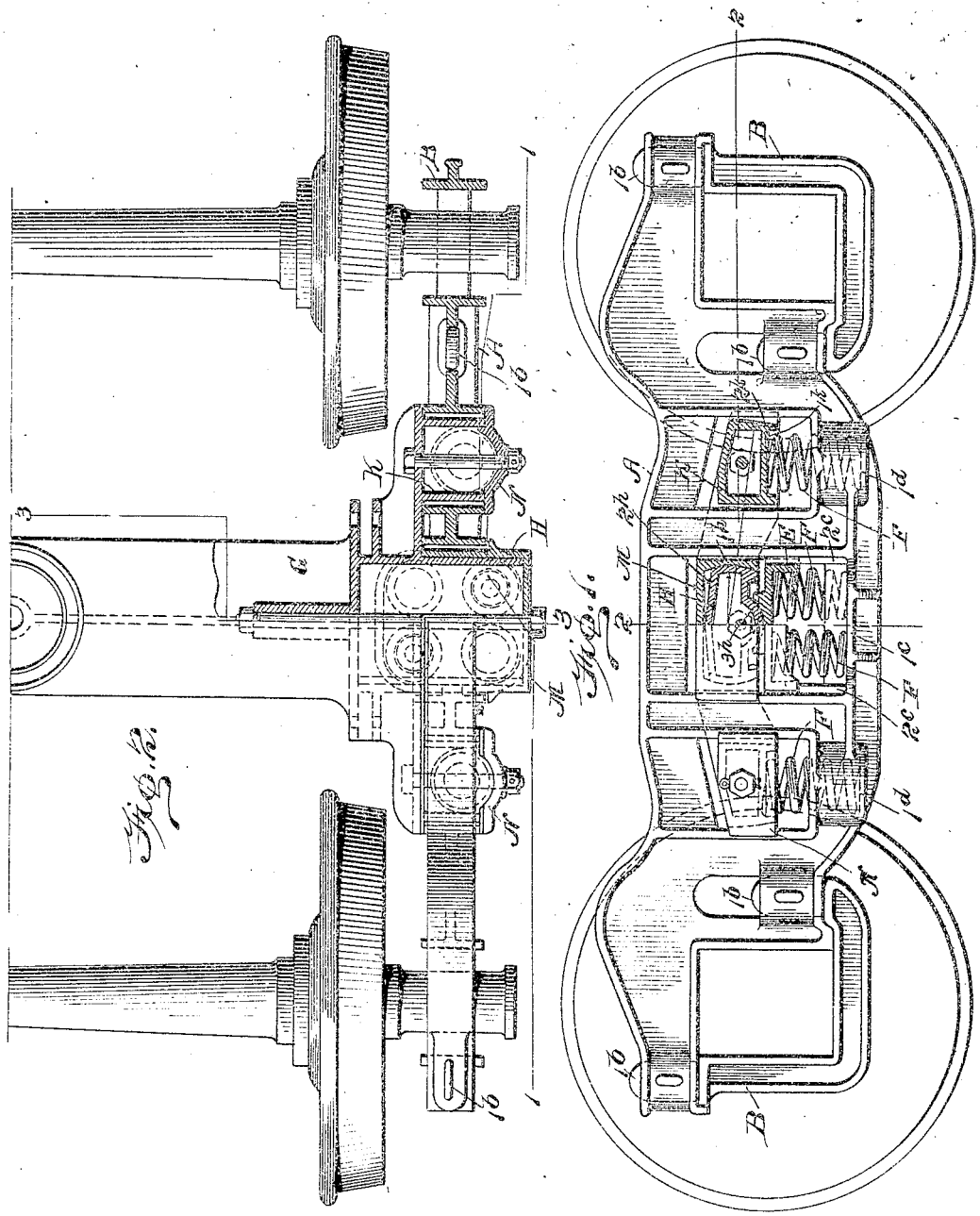

UNITED STATES PATENT OFFICE.

HARRY C. BUHOUP, OF CHICAGO, ILLINOIS.

CAR-TRUCK.

SPECIFICATION forming part of Letters Patent No. 778,739, dated December 27, 1904.

Application filed August 25, 1904. Serial No. 222,080.

*To all whom it may concern:*

Be it known that I, HARRY C. BUHOUP, a citizen of the United States, residing at Chicago, in the county of Cook, State of Illinois, have invented certain new and useful Improvements in Car-Trucks; and I hereby declare the following to be a full, clear, and exact description of the same, reference being had to the accompanying drawings, in which—

Figure 1 is a view, partly in side elevation and partly in section on the line 1 1, Fig. 2, of a car-truck embodying my invention. Fig. 2 is a view of one-half of the truck, a portion thereof being shown in plan and a portion in section on the line 2 2, Fig. 1. Fig. 3 is a transverse vertical section on the line 3 3, Fig. 2. Fig. 4 is a side elevation of one of the side frames. Fig. 5 is a view of one of the side frames, a portion thereof being shown in plan and a portion in section on the line 5 5, Fig. 4. Fig. 6 is a view of one-half the truck-transom, a portion thereof being shown in plan and a portion in section on the line 6 6, Fig. 7. Fig. 7 is an end elevation of the truck-transom. Fig. 8 is a longitudinal vertical central section of one-half of the truck-transom. Fig. 9 is a side elevation of one-half of the truck-transom. Fig. 10 is a plan view of the spring-cap. Fig. 11 is a sectional view of the spring-cap, taken on the line 11 11, Fig. 10. Figs. 12, 13, and 14 are views at right angles to each other, showing one of the transom main caps. Figs. 15, 16, and 17 are views at right angles to each other, showing one of the transom wing-caps.

Like symbols refer to like parts wherever they occur.

My invention relates to the construction of trucks for railway-cars or other vehicles, and has for its object to produce a truck of great flexibility which will accommodate itself to inequalities in the track or road-bed, thus relieving the component truck members from sudden and undue strains, and thereby increasing the life of the truck.

Generally stated, the main feature of my invention resides in a combination wherein the side frames and the transom of a car-truck are so mutually arranged that they may have a relative rectilinear movement and also a relative turning, rotary, or curvilinear movement with respect to each other.

There are other minor features of invention, all as will hereinafter more fully appear.

I will now proceed to describe my invention more fully, so that others skilled in the art to which it appertains may apply the same.

Since both sides of the truck are alike, I have illustrated and shall describe but one-half of the structure.

In the drawings chosen to illustrate my invention, the scope whereof is pointed out in the claims, A is the side frame of a truck which is supported at its extremities by journal-boxes (not shown) in a well-known manner, said journal-boxes being secured to the side frame by detachable stirrups B B, having lugs $1^b 1^b$, which pass through corresponding openings of the side frame, said stirrups B B being retained in position by keys which pass through slots or perforations in the lugs $1^b 1^b$ thereof; but, if desired, the journal-boxes may be attached to the side frame in any other manner. Preferably I form the side frame with a central opening C and openings D D, symmetrically disposed with relation thereto; but the number and arrangement of such openings or equivalent sockets for the reception of the ends of the transom may be varied or the trunnions on the transom may be formed upon the side frames, the transom being provided with apertures or sockets to receive the same. At the base of the central opening C the lower rail of the side frame is broadened out to form a spring-seat $1^c$, and spring seats or pockets $1^d 1^d$ are formed in the side frame at its junction with the base of the openings D D; but such spring-seat and spring-pockets may obviously be made independent of the side frame.

Extending upwardly from the spring-seat $1^c$ and at the sides of the central opening C are the spring-cap guides $2^c 2^c$, which are adapted to engage the corresponding guide-notches $2^e$ of the spring-cap E, said spring-cap guides $2^c 2^c$ being preferably terminated short of the top of the central opening C in order to facilitate the introduction of the transom and transom main cap.

Seated upon the spring-seat $1^c$ and within each of the spring-pockets $1^d$ $1^d$ are coiled springs F or other resilient elements for yieldingly supporting the transom, the spring or group of springs of the central opening C supporting the spring-cap E and the resilient members F of the openings D D preferably directly supporting the transom-wings, as will presently appear. The spring-cap E, which rests upon the central group of springs, is preferably formed with guide-notches or guideways $2^e$ $2^e$, that are adapted to engage the guide-ribs $2^c$ $2^c$, bordering the sides of the central opening C, said spring-cap E having in its upper surface a depression $1^e$, preferably in the form of a segment of a sphere, such depression being designed to receive a corresponding projection upon the under side of the transom; but, if desired, the location of these convex and concave portions may be interchanged.

The yieldingly-supported transom G, which is the means of connecting the side frames A A, is at each of its ends preferably provided with a central trunnion H and a plurality of transom-wings K K; but, if desired, the number of such members may be increased or decreased. The trunnion H is preferably provided with a plurality of curved segmental faces $1^h$ $1^h$, which engage and are adapted to rotate within the trunnion main cap M, the extent of such rotation of the trunnion within the main cap being limited by the engagement of the upper inclined faces $2^h$ $2^h$ of the trunnion with the interior of the main cap M when the desired extent of rotation is reached, said main cap M acting in this respect as a stop. By forming the trunnion H with the curved segmental faces a strong yet compact structure is obtained.

Upon the under side of the main trunnion H is formed a projection $3^h$, preferably a segment of a ball or sphere, such projection $3^h$ engaging the corresponding depression or socket $1^e$ of the vertically-movable spring-cap E, and thereby constituting a vertically-movable flexible joint or connection between the transverse connecting member or transom G and the side frames A A.

The transom-wings K K are preferably upon formed with spring-seats $1^k$ $1^k$, which bear upon their respective springs F F, said spring-seats $1^k$ $1^k$ being slightly curved or inclined upwardly at points farthest removed from the longitudinal axis of the transom in order to relieve such springs of the transverse bending effect upon them when the transom rotates, this rotation being permitted by the clearance allowed between the side trunnions and the borders of the openings D D of the side frame, said transom-wings being also undercut or curved, as at $2^k$ $2^k$, for this purpose.

For the purpose of retaining the side frames A A in planes substantially normal to the truck-transom G, I prefer to secure the transom main cap M and the transom wing-caps N N to the main trunnion H and the transom-wings K K, respectively, by bolts, as shown, or in other suitable manner; but, if desired, the end caps may be omitted and the relation of the transom and side frames be maintained by other suitable means—as, for example, by keys or bolts which pass through such members and bear upon the side frame.

The transom main cap M is constructed with an open or perforated bottom to permit the projection $3^h$ of the transom to engage the depression $1^e$ of the spring-cap E, and the interior of said cap M is provided with curved segmental faces, as at $1^m$ $1^m$, to correspond with the curvature of the faces $1^h$ $1^h$ of the trunnion H.

The lugs, ears, or other portions $2^m$ $2^m$ and $2^n$ $2^n$ of the transom main cap M and transom wing-caps N N, respectively, which bear upon the side frame, may, if desired, have a slight convexity of curvature, thus minimizing the wear between such caps and side frames when the truck is in service.

The transom main cap and the transom wing-caps are secured to the center trunnion and to the transom-wings, respectively, by bolts, as shown, or in other suitable manner, and in order to provide for any lateral movement of the transom main cap I prefer to slightly elongate the bolt-hole in the face thereof.

If desired, the spring-cap E may be omitted and the transom main cap M may perform the function thereof by causing the latter to be directly supported by the springs and to move in vertical guides on the side frame.

The construction of the several members of the truck being substantially such as hereinbefore pointed out, the structure may be assembled by seating the springs F upon the spring-seat $1^c$ and within the spring-pockets $1^d$ $1^d$ of the openings $C^2$ and D D of the side frames A A, then inserting the spring-cap E in the central opening A and causing the notches or guideways $2^e$ $2^e$ thereof to engage the guide-ribs $2^c$ $2^c$, which border the sides of said opening or aperture C, the said spring-cap E resting upon the springs F of the central opening. The main trunnion H and the transom-wings K K of the transom G are then introduced in the proper apertures of the side frames and the transom is lowered until the projection $3^h$ on the under side of the central trunnion H seats itself in the depression $1^e$ of the spring-cap E. The transom main cap M and the transom wing-caps N N are then applied and secured to the transom G, said main cap M operating as a filler-piece to prevent upward movement of the transom independent of the springs; but, if desired, such caps may be omitted and the main trunnion H may be made the full width of the central aperture of the side frame, or a plate or other means may be adopted as a filler between the top of the central transom-trunnion and the side frame. Finally, the journal-boxes, wheels, and axles are secured to the side frames by means of the detachable journal-box guides or stirrups B B.

In the operation of the truck in service it will be observed that upon striking a high or low joint or other inequality in the track the side frame rotates slightly on the transom, compressing the springs or resilient element under one of the transom-wings K, which, with its wing-cap N, rotates relatively to the side frame, such compression operating as a positive means of returning the side frame to its normal position relative to the transom after the obstruction or inequality is passed, as well as constituting a means for cushioning the turning movement of the side frame by the interposed yielding resistance. The component members of the truck are thus relieved from the abnormal strains usually transmitted from one to the other in passing over inequalities in the track and the life of the truck structure is greatly prolonged. The transom G is also adapted to have a vertical rectilinear reciprocation with respect to the side frames by reason of its bearing on the spring-supported spring-caps E E, which move vertically in guides on the side frames, as before pointed out.

Having thus described my invention, what I claim, and desire to secure by Letters Patent, is—

1. A car-truck having side frames and a transverse connecting member adapted to have a relative rectilinear and a relative turning movement with respect to each other.

2. In a car-truck, the combination with side frames, of a yieldingly-supported transom relatively rotatable with respect thereto, substantially as and for the purposes specified.

3. In a car-truck, the combination of side frames and a transom, said parts being relatively rotatable and vertically movable, substantially as and for the purposes specified.

4. In a car-truck, the combination of side frames and a yieldingly-supported transom, said parts being relatively rotatable and vertically movable, substantially as and for the purposes specified.

5. In a car-truck, the combination of side frames and a yieldingly-supported transom, said parts being relatively rotatable, substantially as and for the purposes specified.

6. In a car-truck, the combination with side frames each provided with a plurality of spring-seats, of a plurality of springs seated on said seats, and a transom having at each end a main trunnion and a plurality of transom-wings supported by said springs, substantially as and for the purposes specified.

7. In a car-truck, the combination with side frames, of a yieldingly-supported transom provided with a plurality of trunnions, substantially as and for the purposes specified.

8. In a car-truck, the combination with side frames, of a yieldingly-supported transom relatively rotatable with respect thereto, and means for limiting the extent of such rotation, substantially as and for the purposes specified.

9. In a car-truck, the combination with side frames, of a transom relatively rotatable with respect thereto, and means for cushioning such relative rotation of said side frames and transom, substantially as and for the purposes specified.

10. In a car-truck, the combination with side frames each provided with a plurality of spring-seats, of a plurality of springs seated on said seats, and a rotatable transom having at each of its ends a plurality of transom-wings supported by said springs, substantially as and for the purposes specified.

11. In a car-truck, the combination of side frames and a yieldingly-supported transom, said members having a trunnion-and-socket engagement, substantially as and for the purposes specified.

12. In a car-truck, the combination with side frames, of springs seated on said side frames, spring-caps supported by said springs, and a transom carried by said spring-caps, said side frames and said transom being relatively rotatable, substantially as and for the purposes specified.

13. In a car-truck, the combination with side frames, of springs seated thereon, vertically-movable spring-caps supported by said springs, and a transom relatively rotatable with respect to said side frames, said spring-caps and said transom having ball-and-socket connections between them, substantially as and for the purposes specified.

14. In a car-truck, the combination with side frames, of a transom having a curved segmental trunnion at each of its ends, said side frames and said transom being rotatable relatively, substantially as and for the purposes specified.

15. In a car-truck, the combination with side frames, of a transom having at each of its ends a curved segmental main trunnion and yieldingly-supported transom-wings, and means for yieldingly supporting said transom-wings, substantially as and for the purposes specified.

16. In a car-truck, the combination with side frames, of springs seated thereon, spring-caps bearing upon said springs, a transom supported by said spring-caps and relatively rotatable with respect to said side frames, and means for limiting the extent of such rotation, substantially as and for the purposes specified.

17. In a car-truck, the combination with side frames, of springs seated thereon, vertically-movable spring-caps bearing upon said springs, a transom supported by said spring-caps, and transom-caps secured to the ends of said transom, substantially as and for the purposes specified.

18. In a car-truck, the combination with side frames, of springs seated thereon, a transom having a trunnion at each of its ends, and means interposed between said springs and said transom adapted to permit a rotation and a vertical movement of the latter relatively to said side frames, substantially as and for the purposes specified.

19. In a car-truck, the combination with side frames, of springs seated thereon, a transom having segmental trunnions supported by said springs, and transom-caps having curved segmental faces on the interior, substantially as and for the purposes specified.

20. In a car-truck, the combination with side frames, of springs seated thereon, vertically-movable spring-caps bearing upon said springs, a transom having segmental trunnions supported by said springs and having ball-and-socket connections with said spring-caps, and transom-caps having curved segmental faces on the interior, substantially as and for the purposes specified.

21. In a car-truck, the combination with side frames, of springs seated thereon, and a transom provided at each of its ends with a plurality of members having curved segmental faces, said transom yieldingly supported by said springs, substantially as and for the purposes specified.

22. In a car-truck, the combination with side frames, of springs seated thereon, a transom having at each of its ends a main trunnion and transom-wings, spring-caps having ball-and-socket connections with said main trunnion, and transom-caps for said main and transom-wings, substantially as and for the purposes specified.

In testimony whereof I affix my signature, in presence of two witnesses, this 23d day of August, 1904.

HARRY C. BUHOUP.

Witnesses:
ALBERT J. BUCKLEY,
E. C. BATES.